No. 636,731. Patented Nov. 7, 1899.
G. E. HALL.
COFFEE OR TEA POT.
(Application filed June 14, 1899.)
(No Model.)
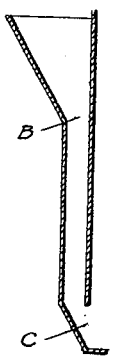
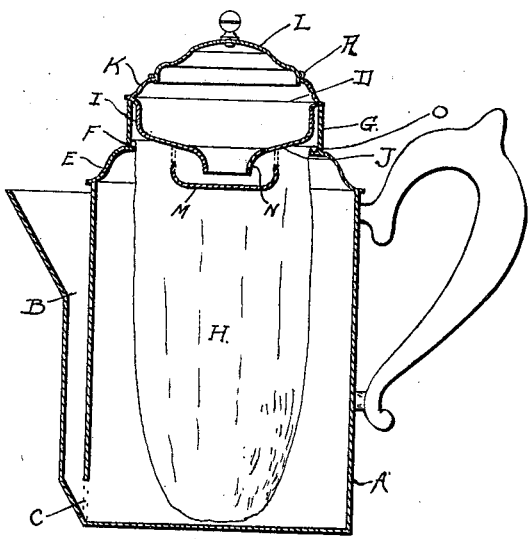
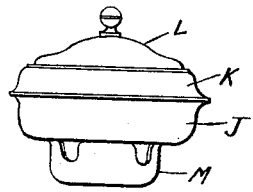
Witnesses.
Gideon E. Hall,
Inventor.

UNITED STATES PATENT OFFICE.

GIDEON E. HALL, OF STRATFORD, CONNECTICUT.

COFFEE OR TEA POT.

SPECIFICATION forming part of Letters Patent No. 636,731, dated November 7, 1899.

Application filed June 14, 1899. Serial No. 720,572. (No model.)

*To all whom it may concern:*

Be it known that I, GIDEON E. HALL, a citizen of the United States, residing at Stratford, in the county of Fairfield and State of Connecticut, have invented certain new and useful Improvements in Coffee or Tea Pots; and I do declare the following to be a full, clear, and exact description of the invention, such as will enable others skilled in the art to which it appertains to make and use the same.

My invention relates to improvements in that class of coffee or tea pots which are constructed with a view of preventing the escape of the steam of the beverage, as well also of knowing the exact amount of the same within the pot at any point without removing the cover, and its novelty will be fully understood from the following description and claim when taken in conjunction with the annexed drawings, in which—

Figure 1 is a sectional view of a coffee or tea pot with my improvements applied. Figs. 2 and 3 are respectively a sectional detail and an elevation of certain parts removed from the pot.

Referring by letter to said drawings, A indicates the body of the pot, and B, preferably, a spout-tube bent, as shown in Fig. 1, to insure a clean discharge from the spout thereof and connected to the exterior of the pot and extending to the bottom of the same, where it is adjacent to a space C, arranged in the wall of the pot. The practical use of this spout-tube B is, first, to afford a means of observation whereby the quantity of beverage within the pot may be determined at any point without removing the cover, which would be objectionable because it would destroy the effect intended in a pot of this class; second, to draw the beverage from the bottom of the pot instead of the top, thereby effectually preventing the escape of any steam from the body of the liquid through this spout-tube B. The body of the pot is further provided at its upper end with a top E, connected to or formed integral with it and provided with a central opening F.

G indicates a collar connected to or formed integral with the top E and surrounding the central opening F, above referred to, and made sufficiently large relative to the opening to allow a ring O of the coffee or tea holding bag H to drop easily through it and bear on or be supported at the edge of the central opening F. This ring O is preferably broken when it is desirable to replace an old bag by a new one. The upper part of the pot is further provided with a removable combination cover bearing on and arranged in the collar G. A restricted opening N and funnel J and rim I are made integral and connect with a water-guard K at a point bearing on the collar G. This water-guard K, during the process of pouring hot water within from which the beverage would be made, confines the same within the funnel J and rim I and effectually prevents any overflow. This water-guard K is further provided with a central opening R, with a cap L arranged therein, which when closed forms an air-chamber D for the purpose of retaining and intensifying the heat within the pot.

A basin M, with its bottom adjacent to and its sides surrounding and adjacent to the restricted opening N, has spaces arranged in its edge of such shape as to facilitate cleansing at a higher elevation than the extreme point of the restricted opening N and is connected to the funnel J underneath. The purpose of this basin M is to retain a portion of the water from which the beverage would be made around and in the restricted opening N, thereby effectually preventing any of the steam of the beverage from entering the same and escaping during the introduction of hot water within the pot.

It will be seen in Fig. 1 that the ingredients within the bag H are so located with reference to the outlet of the spout-tube B that they cannot float so high as to enter the spaces in the edge of the basin M when in use and cause trouble in cleansing or otherwise, and further additional sealed air-chambers arranged in the cover would be superfluous, adding extra cost to manufacture, would not submerge in a nickel solution without force when completed, nor be readily cleansed thereafter, and when in use produce no better results in coffee or tea.

In the practice of my invention the ingredients from which the beverage is to be made are placed in the bag H, previously scalded and rinsed in cold water. The cover is then placed in position on and in the collar G and its cap L removed or opened. Boiling-hot water is then poured through the water-guard K and is by it confined within the rim I while it passes through the funnel J into the basin M, thence through the spaces of its edge into the ingredients of the bag H within the pot, thereby producing a water seal of the basin M in conjunction with the restricted opening N, which also, in conjunction with the spout-tube B, connecting with the interior of the pot at its bottom through the space C in its wall, effectually prevents the aroma of the beverage from escaping. The cap L is then closed. The exact amount of beverage within the pot may be determined at any point as the hot water is being introduced by observing its line or surface within the spout-tube B, which will precisely correspond to that within the pot. From one to five minutes are required for the operation, according as the ingredients are ground and the quantity made.

As before stated, the restricted opening N and funnel J are formed integral with the rim I, and the upper edge of the rim I is connected to the lower part of the water-guard K at the point bearing on the collar G, as shown in Fig. 1, and it therefore will be seen that the combination-cover, including the cap L and basin M, form an attachment which may be readily removed for cleansing of itself and the pot also. It will also be seen from the foregoing, inasmuch as the funnel J and restricted opening N and rim I may be formed integral, as well as the spout-tube B also, that my improved pot may be made cheaper than would be otherwise possible and cost nearly the same as common pots now in use.

I am aware that prior to my invention coffee or tea pots have been made with sealed air-chambers for condensing steam, operating in conjunction with a water seal. I therefore do not claim such a combination broadly; but What I do claim as my invention, and desire to secure by Letters Patent, is—

A coffee-pot, consisting essentially of the body A, having a top E provided with a central opening, a collar G, located above and surrounding said opening, a support substantially at the opening to receive the ring of a coffee-percolator which shall be also contiguous to the collar G, and within the same, and a removable member formed to rest upon the collar G, and comprising a cover L, a water-guard K, a funnel I joined to the guard K, at the point of support on the collar, the parts L, K, and I forming a hot-air chamber, the basin M attached to said chamber, adjacent to the restricted opening of the funnel and having outlets located in a plane above the lower end of said restricted opening.

In testimony whereof I affix my signature in presence of two witnesses.

GIDEON E. HALL.

Witnesses:
R. R. STANNARD,
JOHN L. PIERPONT.